Jan. 9, 1962 E. O. STUART 3,015,892
THREAD DEPTH GAUGE
Filed July 20, 1960
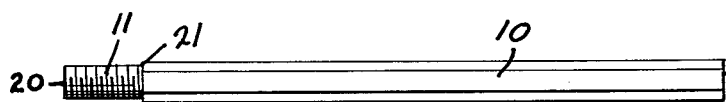 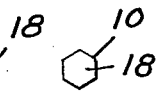
Fig. 1  Fig. 2
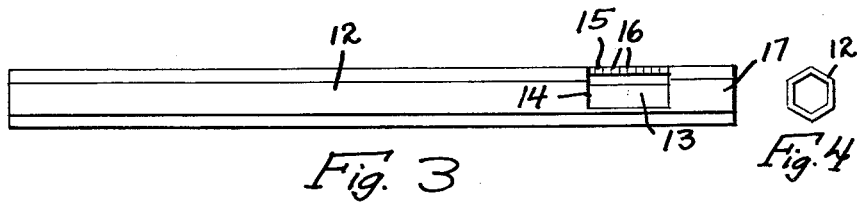 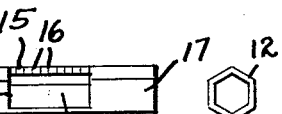
Fig. 3  Fig. 4
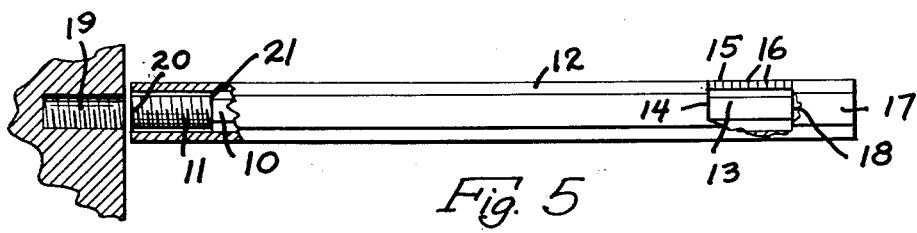
Fig. 5
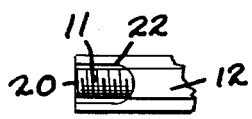
Fig. 6
INVENTOR.
Edward O. Stuart
BY Sam J. Slotsky
ATTORNEY

United States Patent Office 3,015,892
Patented Jan. 9, 1962

3,015,892
THREAD DEPTH GAUGE
Edward O. Stuart, 1209 S. Irene St., Sioux City, Iowa
Filed July 20, 1960, Ser. No. 44,099
4 Claims. (Cl. 33—169)

My invention relates to a thread depth gauge.

An object of my invention is to provide a gauge which will accurately indicate when a tapped or threaded hole is of the correct depth.

A further object of my invention is to provide a very simple structure which can be quickly applied to the threaded opening, and which will indicate the correct depth without requiring extra measuring tools and the like.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of one portion of the device,

FIGURE 2 is an end view of FIGURE 1,

FIGURE 3 is a side elevation of the outer sleeve of the device,

FIGURE 4 is an end view of FIGURE 3,

FIGURE 5 is a side elevation with parts taken in section of the assembled device, and FIGURE 6 is a modification.

My invention contemplates the provision of a simple gauge arrangement which is used for quickly indicating whether a threaded opening is of the proper depth, and which arrangement can also be used for indicating the correct depth of the opening, if desired.

I have used the character 10 to indicate a hexagonal male rod having the end portion 11 which is threaded, the threads on this male portion corresponding to the threads which are in the threaded opening which is to be checked to see whether it is of the proper depth. The portion 11 is also of the same length as the threaded opening which is to be checked.

I have further used the character 12 to indicate a hollow hexagonal tube having a cut-out portion at 13, thereby providing a shoulder at 14, and along the exposed edge 15 I provide the indicating gauge markings 16.

The tube 12 includes an extending portion 17 to facilitate turning of the arrangement when used.

The device is shown in its assembled condition in FIGURE 5, and for use the hollow tube 12 is slipped over the male unit 10. The end 18 of the male rod 10 will be positioned as shown in FIGURE 5, and the length of the cut-out portion 13 will be exactly the same length as the threaded portion at 11, and will also be the same length as the threaded cavity 19 (see FIGURE 5) which is to be checked. The end 20 of the threaded portion 11 is then placed so that it will enter into the threaded cavity 19, and the outer tube 12 is rotated by the fingers, and as the threaded portion 11 rotates, it will naturally feed inwardly into the cavity 19 due to the threaded engagement, and as soon as the shoulder at 21 abuts against the portions around the threaded hole 19, it will no longer be possible to rotate the arrangement.

At this point the end 18 of the rod 10 should be exactly coincident with the shoulder 14, which will thereby indicate that the tapped hole 19 is of the required depth.

The arrangement can also be used to indicate various depths if desired by merely noting where the end 18 registers with such markings.

FIGURE 6 illustrates a slight modification wherein the end of the tube 12 includes the cut-out portion at 22 which allows the operator to more conveniently center the end of the portion 11 within the opening.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A thread depth gauge comprising a hexagonal male rod including a threaded end portion, said end portion being adapted to be received in a threaded cavity, a hollow hexagonal tube receiving said male rod, said hollow tube including a cut-out portion, said cut-out portion including an inner shoulder adapted to register with the outer end of said male rod when a required depth is to be checked.

2. A thread depth gauge comprising a hexagonal male rod including a threaded end portion, said end portion being adapted to be received in a threaded cavity, a hollow hexagonal tube receiving said male rod, said hollow tube including a cut-out portion, said cut-out portion including an inner shoulder adapted to register with the outer end of said male rod when a required depth is to be checked, said hollow tube including a gauge portion adjacent to said cut-out portion.

3. A thread depth gauge comprising a hexagonal male rod including a threaded end portion, said end portion being adapted to be received in a threaded cavity, a hollow hexagonal tube receiving said male rod, said hollow tube including a cut-out portion, said cut-out portion including an inner shoulder adapted to register with the outer end of said male rod when a required depth is to be checked, said hollow tube including a gauge portion adjacent to said cut-out portion, said threaded end portion being of the same length as the depth of said threaded cavity.

4. A thread depth gauge comprising a hexagonal male rod including a threaded end portion, said end portion being adapted to be received in a threaded cavity, a hollow hexagonal tube receiving said male rod, said hollow tube including a cut-out portion, said cut-out portion including an inner shoulder adapted to register with the outer end of said male rod when a required depth is to be checked, said hollow tube including a gauge portion adjacent to said cut-out portion, said threaded end portion being of the same length as the depth of said threaded cavity, said hollow tube having a further cut-out portion adjacent to the end of said threaded end portion to provide means for visual centering of said threaded end portion.

No references cited.